United States Patent
Kim

(10) Patent No.: US 12,384,381 B2
(45) Date of Patent: Aug. 12, 2025

(54) PLATOONING CONTROLLER BASED ON DRIVER STATE, SYSTEM INCLUDING THE SAME, AND METHOD THEREOF

(71) Applicants: Hyundai Motor Company, Seoul (KR); Kia Corporation, Seoul (KR)

(72) Inventor: Kyeong Eun Kim, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 788 days.

(21) Appl. No.: 17/322,144

(22) Filed: May 17, 2021

(65) Prior Publication Data

US 2022/0126841 A1 Apr. 28, 2022

(30) Foreign Application Priority Data

Oct. 27, 2020 (KR) .................. 10-2020-0140555

(51) Int. Cl.
| | |
|---|---|
| *B60W 40/09* | (2012.01) |
| *B60W 10/18* | (2012.01) |
| *B60W 30/09* | (2012.01) |
| *B60W 30/165* | (2020.01) |
| *B60W 30/18* | (2012.01) |

(Continued)

(52) U.S. Cl.
CPC ............ *B60W 40/09* (2013.01); *B60W 10/18* (2013.01); *B60W 30/09* (2013.01); *B60W 30/165* (2013.01); *B60W 30/18163* (2013.01); *B60W 60/0015* (2020.02); *B60W 60/0053* (2020.02); *G08G 1/22* (2013.01); *B60W 2040/0827* (2013.01); *B60W 2540/229* (2020.02); *B60W 2540/30* (2013.01); *B60W 2555/60* (2020.02); *B60W 2556/65* (2020.02)

(58) Field of Classification Search
CPC .............. G05D 1/0295; B60W 30/165; B60W 2040/0827; B60W 2540/229; B60W 2540/26; G08G 1/22
See application file for complete search history.

(56) References Cited

U.S. PATENT DOCUMENTS 10,896,606 B1 * 1/2021 Hayes .................. G05D 1/0022
2004/0078133 A1 * 4/2004 Miller .................. B60W 30/16
180/170

(Continued)

FOREIGN PATENT DOCUMENTS

| | | | | |
|---|---|---|---|---|
| CN | 104408878 A | * | 3/2015 | ............ G08B 21/06 |
| CN | 109774715 A | * | 5/2019 | |

(Continued)

OTHER PUBLICATIONS

Machine translation of CN-104408878-A (Year: 2015).*
Machine translation of CN-109976346-A (Year: 2019).*
Machine translation of CN-109774715-A (Year: 2019).*

*Primary Examiner* — Hitesh Patel
*Assistant Examiner* — Caitlin R McCleary
(74) *Attorney, Agent, or Firm* — SLATER MATSIL, LLP

(57) ABSTRACT

A platooning controller includes a processor configured to perform platooning control based on a driver state and to determine a platooning driver emergency assist (DEA) mode based on a careless driving state or a drowsy driving state of a driver, and a memory configured to store data and an algorithm to be executed by the processor to perform the platooning control.

14 Claims, 13 Drawing Sheets

(51) Int. Cl.
*B60W 40/08* (2012.01)
*B60W 60/00* (2020.01)
*G08G 1/00* (2006.01)

(56) References Cited

U.S. PATENT DOCUMENTS

| | | | | |
|---|---|---|---|---|
| 2012/0212353 | A1* | 8/2012 | Fung | G08G 1/167 |
| | | | | 701/1 |
| 2014/0316671 | A1* | 10/2014 | Okamoto | G08G 1/22 |
| | | | | 701/96 |
| 2017/0011633 | A1* | 1/2017 | Boegel | B60W 30/18163 |
| 2018/0374366 | A1* | 12/2018 | Reimann | B60T 7/22 |
| 2019/0202472 | A1 | 7/2019 | Lee et al. | |
| 2020/0209889 | A1* | 7/2020 | Dev | G08G 1/166 |
| 2021/0171034 | A1* | 6/2021 | Nachnolkar | B60W 30/165 |
| 2022/0118975 | A1 | 4/2022 | Kim | |

FOREIGN PATENT DOCUMENTS

| | | | | | |
|---|---|---|---|---|---|
| CN | 109976346 | A | * | 7/2019 | |
| KR | 100283321 | B1 | | 4/2001 | |
| KR | 20190079844 | A | | 7/2019 | |
| KR | 20220051889 | A | | 4/2022 | |
| WO | WO-2017204712 | A1 | * | 11/2017 | |
| WO | WO-2018035145 | A1 | * | 2/2018 | B60W 30/165 |

\* cited by examiner

```
PLATOON EMERGENCY BRAKING
    CONTROL MODE HAS STARTED.
  CAUSE: DROWSY DRIVING OF FV2
    REMAINING TIME: 10 SECONDS

MY CHOICE :              CHOICE OF PLATOON :
CURRENT PLATOON          CURRENT PLATOON
MAINTENANCE              MAINTENANCE (1)

NEW PLATOON FORMATION    NEW PLATOON FORMATION (2)
PLATOON DEPARTURE        PLATOON DEPARTURE (1)

NEW PLATOON PREVIEW
```

FV4→FV1     FV1→LV

PLATOONING CONTROLLER BASED ON DRIVER STATE, SYSTEM INCLUDING THE SAME, AND METHOD THEREOF

CROSS-REFERENCE TO RELATED APPLICATIONS

This application claims the benefit of Korean Patent Application No. 10-2020-0140555, filed in the Korean Intellectual Property Office on Oct. 27, 2020, which application is hereby incorporated herein by reference.

TECHNICAL FIELD

The present disclosure relates to a platooning controller, a system including the same, and a method thereof.

BACKGROUND

Platooning is a technology in which a plurality of vehicles perform autonomous driving in the state where they are arranged at a specified interval in line. When the plurality of vehicles are platooning, a leading vehicle which is a vehicle located in the frontline of a string may control one or more following vehicles which follow the leading vehicle. The leading vehicle may maintain an interval between the plurality of vehicles included in the string and may exchange behavior and situation information of the plurality of vehicles included in the string using inter-vehicle communication.

A conventional driver emergency assist (DEA) device may provide the driver with an alert, when the driver drives while drowsy or drives carelessly, and may maintain a line to perform stop control, when there is no driver response.

When such careless driving alert and stop control are applied without change, convenience of platooning may be reduced due to an unnecessary alert and unnecessary braking in a situation where stability of platooning is high.

SUMMARY

Embodiments of the present disclosure can solve problems occurring in the prior art while advantages achieved by the prior art are maintained intact.

The present disclosure relates to a platooning controller, a system including the same, and a method thereof. Particular embodiments relate to technologies of performing platooning control according to careless driving or drowsy driving of a driver.

An embodiment of the present disclosure provides a platooning controller for performing platooning emergency driving control depending on a driver state to increase convenience and stability of platooning and quickly re-forming a new platoon when there is a vehicle which performs emergency braking control among vehicles in a string to increase platooning efficiency, a system including the same, and a method thereof.

The technical problems to be solved by embodiments of the present disclosure are not limited to the aforementioned problems, and any other technical problems not mentioned herein will be clearly understood from the following description by those skilled in the art to which the present disclosure pertains.

According to an embodiment of the present disclosure, a platooning controller may include a processor that performs platooning control based on a driver state and a storage storing data and an algorithm run by the processor. The processor may determine a platooning driver emergency assist (DEA) mode depending on a careless driving state or a drowsy driving state of a driver.

In an embodiment, the careless driving state or the drowsy driving state of the driver may be classified as a safety level, a caution level, or a critical level based on a ratio where the driver keeps his or her eyes on the road or a drowsiness recognition time.

In an embodiment, the processor may classify the platooning DEA mode as a normal mode, a safety mode, an alert mode, a braking control mode, or a platoon re-formation mode depending on the careless driving state or the drowsy driving state of the driver.

In an embodiment, the processor may enter the safety mode, when the careless driving state or the drowsy driving state of the driver of at least one of platooning vehicles is above the caution level.

In an embodiment, the processor may set a platoon setting speed to a predetermined ratio of a road speed limit in the safety mode and may set an inter-vehicle distance between a vehicle where the careless driving state or the drowsy driving state of the driver is above the caution level and a following vehicle to a maximum value.

In an embodiment, the processor may enter the alert mode, when a careless driving state or a drowsy driving state of a driver of a leading vehicle among platooning vehicles continues in the caution level or the critical level during a predetermined period or when a drowsy driving state of a driver of a following vehicle is in the caution level.

In an embodiment, the processor may set inter-vehicle distances between all vehicles in a string to a maximum value, in the alert mode.

In an embodiment, the processor may enter the braking control mode, when a leading vehicle enters a braking state or when a drowsy driving state of a driver of a following vehicle is in the critical level.

In an embodiment, the processor may control all vehicles in a string to perform braking control, in the braking control mode.

In an embodiment, the processor may allow a driver of each of the platooning vehicles to select one of platoon departure, new platoon formation, or current platoon maintenance, in the braking control mode.

In an embodiment, the processor may receive a selection from the driver before stopping after entering the braking control mode.

In an embodiment, the processor may enter the platoon re-formation mode, when the selection of the driver is completed.

In an embodiment, the processor may hand over vehicle control authority to the driver, when the driver selects the platoon departure.

In an embodiment, the processor may control a lane change to a left lane or a right lane to form a new string and adjust an interval in the new string, when the driver selects the new platoon formation.

In an embodiment, the processor may determine whether there is a non-platooning vehicle in the new string after completing the lane change and may set the non-platooning vehicle to an obstacle vehicle (OV) to perform platoon control in an OV mode.

In an embodiment, the processor may control a speed of each of the platooning vehicles to maintain a distance from a vehicle in a careless driving state or a drowsy driving state as a predetermined distance, may determine whether a vehicle which selects the platoon departure or the new platoon formation remains in the current string, and may set the remaining vehicle to an OV to perform platoon control in an OV mode when the vehicle remains, when the driver selects the current platoon maintenance.

According to another embodiment of the present disclosure, a vehicle system may include a driver state determining device that determines a careless driving state or a drowsy driving state of a driver and a platooning controller that determines a platooning driver emergency assist (DEA) mode depending on the careless driving state or the drowsy driving state of the driver and performs platooning control.

In an embodiment, the platooning controller may classify the platooning DEA mode as a normal mode, a safety mode, an alert mode, a braking control mode, or a platoon re-formation mode depending on the careless driving state or the drowsy driving state of the driver.

In an embodiment, the vehicle system may further include an interface that displays a screen for receiving a driver selection and an example of platoon re-formation by the driver selection in the form of a preview, in a platooning situation and the platoon re-formation mode of the platooning DEA mode.

According to another embodiment of the present disclosure, a platooning control method may include determining a careless driving state or a drowsy driving state of a driver, determining a platooning DEA mode depending on the careless driving state or the drowsy driving state of the driver, and performing platooning control depending on the determined platooning DEA mode.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
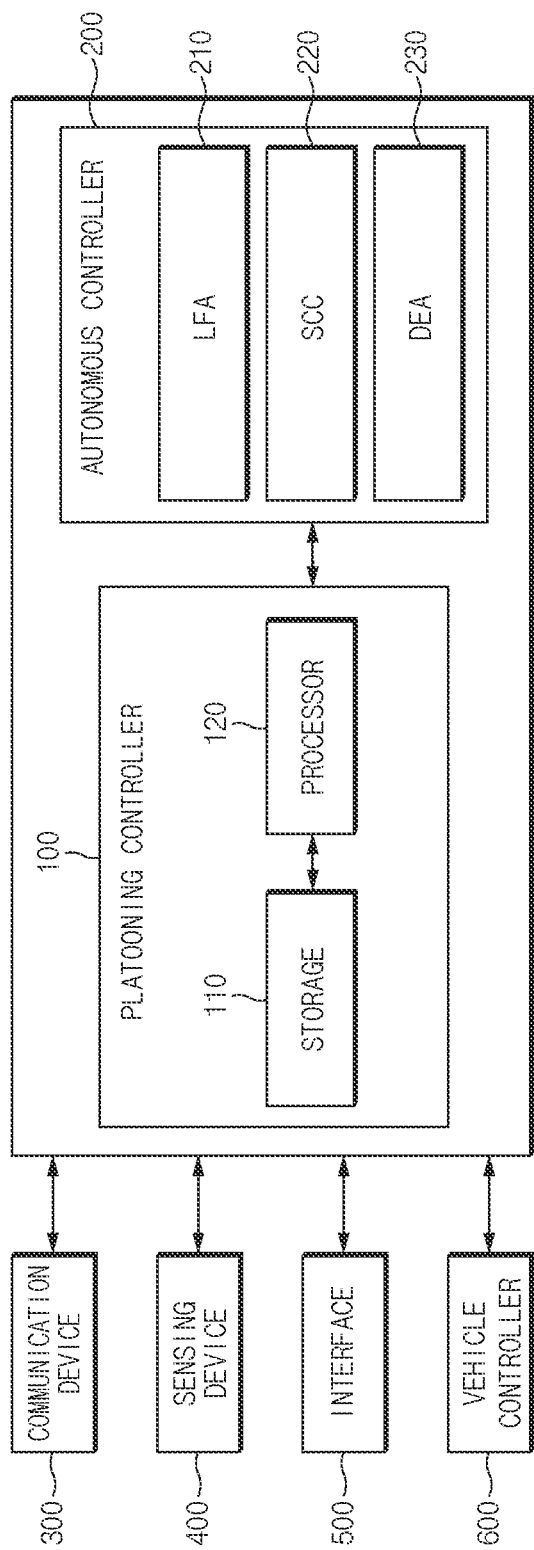
FIG. 1 is a block diagram illustrating a configuration of a vehicle system including a platooning controller according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 10.

A leading vehicle LV and a following vehicle FV included in a platooning group may perform platooning on the road. The leading vehicle LV and the following vehicle FV may travel while maintaining a specified distance. While driving, the leading vehicle LV or the following vehicle FV may adjust a distance between the leading vehicle LV and the following vehicle FV. The leading vehicle LV or the following vehicle FV may increase or decrease an inter-vehicle distance depending on manipulation of a driver.

FIG. 1 is a block diagram illustrating a configuration of a vehicle system including a platooning controller according to an embodiment of the present disclosure.

The platooning controller 100 according to an embodiment of the present disclosure may be implemented in a vehicle. In this case, the platooning controller 100 may be integrally configured with control units in the vehicle or may be implemented as a separate device to be connected with the control units of the vehicle by a separate connection means.

Referring to FIG. 1, the vehicle system according to an embodiment of the present disclosure may include a platooning controller 100, an autonomous controller 200, a communication device 300, a sensing device 400, an interface 500, and a vehicle controller 600.

The autonomous controller 200 may include a lane following assist (LFA) 210, a smart cruise control (SCC) 220, a driver emergency assist (DEA) 23o, or the like.

The LFA 210 may control the vehicle to travel on the center of the lane.

The SCC 220 may control an inter-vehicle distance between a forward vehicle and a host vehicle to be maintained a predetermined distance.

The DEA 230 may interwork with the platooning controller 100 to provide the driver with an alert, when the driver drives while drowsy or drives carelessly, and may keep a lane to perform stop control, when there is no driver response. In other words, the DEA 230 may determine a careless driving state and a drowsy driving state of the driver and may provide the platooning controller 100 with the result.

The careless driving state of the driver may refer to a state where the driver does not keep his or her eyes on the road. The drowsy driving state of the driver may refer to a state where the driver closes his or her eyes, which may be classified in level according to persistence of the drowsy state.

Each of the careless driving state and the drowsy driving state of the driver may be classified as a safety level, a caution level, or a critical level as shown in Table 1 below.

TABLE 1

| Level | Careless Driving | Drowsy Driving |
|---|---|---|
| Safety Level | 70~100% of when the driver keeps his or her eyes on the road | No drowsiness recognition |
| Caution Level | 30~70% of when the driver keeps his or her eyes on the road | Drowsy state is less than n seconds |
| Critical Level | 0~30% of when the driver keeps his or her eyes on the road | Drowsy state is greater than or equal to n seconds |

As shown in Table 1 above, the DEA 230 may determine the careless driving state and the drowsy driving state using a degree to which the driver keeps his or her eyes on the road and a drowsiness recognition time and may transmit the determined result to the platooning controller 100. In other words, the DEA 230 may calculate a time when the driver keeps his or her eyes on the road between now and the past n seconds by percentage (%) and may classify the careless driving state and the drowsy driving state of the driver into three levels (e.g., the safety level, the caution level, and the critical level) depending on a degree to which the driver keeps his or her eyes on the road. Furthermore, the DEA 230 may determine the drowsy state as the caution level, when the drowsy state occurs below n seconds, and may determine the drowsy state as the critical level, when the drowsy state occurs above n seconds.

The platooning controller 100 may determine a platooning DEA mode depending on the careless driving state or the drowsy driving state of the driver and may perform platooning control.

To this end, the platooning controller 100 may include a storage no and a processor 120.

The storage no may store information received from the communication device 300, a sensing result of the sensing device 400, data obtained by the processor 120, and the like. The storage no may store data, an algorithm, and/or the like necessary for an operation of the platooning controller 100.

As an example, the storage 110 may store information about the driver careless state or the drowsy driving state, which is received from the DEA 230 in the autonomous controller 200. Furthermore, the storage 110 may store string merging information, string release information, braking information of a forward vehicle, driving information of the forward vehicle, or the like, which is received through vehicle-to-infrastructure (V2I) communication. Furthermore, the storage 110 may store information about a forward obstacle, for example, a forward vehicle, which is detected by the sensing device 400.

Furthermore, the storage no may store data and an algorithm for classifying a platooning DEA mode according to careless driving or drowsy driving of the driver.

The storage no may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 120 may be electrically connected with the autonomous controller 200, the communication device 300, the sensing device 400, the interface 500, the vehicle controller 600, the storage 110, and the like and may electrically control the respective components. The processor 120 may be an electrical circuit which executes instructions of software and may perform a variety of data processing and calculation, which will be described below. The processor 120 may be, for example, an electronic control unit (ECU), a micro controller unit (MCU), or another sub-controller, which is loaded into the vehicle.

The processor 120 may determine a platooning DEA mode depending on a careless driving state or a drowsy driving state of the driver and may perform platooning depending on the determined platooning DEA mode.

In this case, the careless driving state or the drowsy driving state of the driver may be classified as the safety level, the caution level, or the critical level based on a ratio where the driver keeps his or her eyes on the road or a drowsiness recognition time.

When the host vehicle is a leading vehicle, the processor 120 may start to provide an alert, when the careless driving state or the drowsy driving state is maintained in the 'caution' or 'critical' level during a certain time. When the caution or critical level does not return to the safety level although a predetermined time elapses after starting to provide the alert, the processor 120 may start to control braking at a predetermined deceleration. The processor 120 may continue the braking control until the vehicle stops and may release the braking control when the driver state returns to the safety level during the braking control.

The processor 120 may differently apply an alert and braking control time depending on operation reliability of the autonomous controller 200. In other words, the processor 120 may delay a careless driving alert and braking time in an interval where the operation reliability of the autonomous controller 200 is high.

Meanwhile, when the host vehicle is a following vehicle, the processor 120 may determine a braking control state of a leading vehicle. When the leading vehicle is not in the braking control state, the processor 120 of the following vehicle may provide a careless driving alert and may perform stop control. Thus, the processor 120 may guide the driver to maintain a state where the driver may concentrate on driving immediately when the alert is sounded. On the other hand, when the leading vehicle is in a braking control state, the processor 120 may provide an alert and may perform braking, like the DEA 23o in a general driving state rather than a platooning state.

The processor 120 may determine a platooning DEA mode depending on the careless driving state and the drowsy driving state received from the DEA 230. The platooning DEA mode may be classified as a normal mode, a safety mode, an alert mode, a braking control mode, or a platoon re-formation mode.

The normal mode may be a state where platooning emergency control does not operate.

When a careless driving state or a drowsy driving state of a driver of at least one of platooning vehicles is above the caution level, the processor 120 may enter the safety mode. In other words, when a careless driving state of a driver of at least one of the vehicles participating in platooning is the caution level or a drowsy driving state of the driver is above the caution level, the processor 120 may enter the safety mode of the platooning DEA mode.

In the safety mode, the processor 120 may set a platoon setting speed to a predetermined ratio of the road speed limit and may set an inter-vehicle distance between a vehicle where the careless driving state or the drowsy driving state of the driver is above the caution level and a following vehicle to a maximum value. In other words, in the safety mode, a maximum setting speed in the entire platoon may be limited to 90% of the road speed limit. For example, when the vehicle is traveling on the road where the road speed limit is 100 kph, a setting speed of the vehicle may be limited to 90 kph. Furthermore, in the safety mode, the processor 120 may change an inter-vehicle distance between a vehicle where the careless driving state is in the caution level or where the drowsy driving state is in the caution level and a following vehicle behind the vehicle to the maximum value.

Figure 2:
FIG. 2 is a drawing illustrating an exemplary screen in a safety mode according to an embodiment of the present disclosure.

FIG. 2 is a drawing illustrating an exemplary screen in a safety mode according to an embodiment of the present disclosure. Referring to FIG. 2, as a careless driving state of a driver of a following vehicle FV2 is in a caution level, when entering a safety mode, a processor 120 of FIG. 1 may increase an inter-vehicle distance between following vehicles FV1 and FV2 and an inter-vehicle distance between following vehicles FV2 and FV3 to a maximum value.

When a careless driving state or a drowsy driving state of a driver of a leading vehicle LV among platooning vehicles continues in the caution level or a critical level during a predetermined time or when a drowsy driving state of a driver of a following vehicle is in the critical level, the processor 120 may enter an alert mode. In the alert mode, the processor 120 may set inter-vehicle distances between all vehicles in a string to a maximum value.

In other words, when the leading vehicle LV continues careless driving or drowsy driving during a predetermined time or when the drowsy driving state is in the critical level, the processor 120 may enter the alert mode of the platooning DEA mode. In the alert mode, settings of inter-vehicle distances between all vehicles which participate in platooning may change to a maximum value. The processor 120 may alert the driver using a sound, a screen, or the like by means of an interface 500 or a separate alert device.

Figure 3:
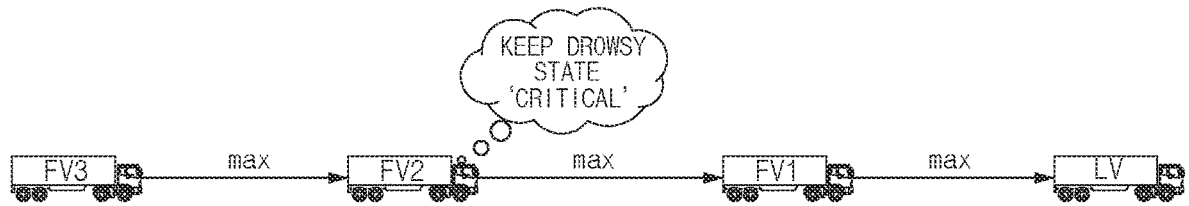
FIG. 3 is a drawing illustrating an exemplary screen in an alert mode according to an embodiment of the present disclosure.

FIG. 3 is a drawing illustrating an exemplary screen in an alert mode according to an embodiment of the present disclosure. Referring to FIG. 3, when a careless driving state of a driver of a following vehicle FV2 is in a caution level, it may be seen that a processor 120 enters the alert mode and increases inter-vehicle distances between all of platooning vehicles LV, FV1, FV2, and FV3 to a maximum value.

When the leading vehicle LV enters a braking state or when a drowsy driving state of the driver of the following vehicle FV2 is in a critical level, the processor 120 may enter a braking control mode. In the braking control mode, the processor 120 may control all vehicles in a string to perform braking control.

Furthermore, in the braking control mode, the processor 120 may allow each of the drivers of the platooning vehicles to select one of platoon departure, new platoon formation, or current platoon maintenance. The processor 120 may allow each driver to select one of the platoon departure, the new platoon formation, or the current platoon maintenance before stopping after entering the braking control mode. In this case, the processor 120 may change the selection of the driver before stopping.

When the leading vehicle LV enters the braking control mode or when the drowsy driving state of the driver of the following vehicle FV2 is in the critical level, the processor 120 may enter the braking control mode of the platooning DEA mode.

Figure 4:
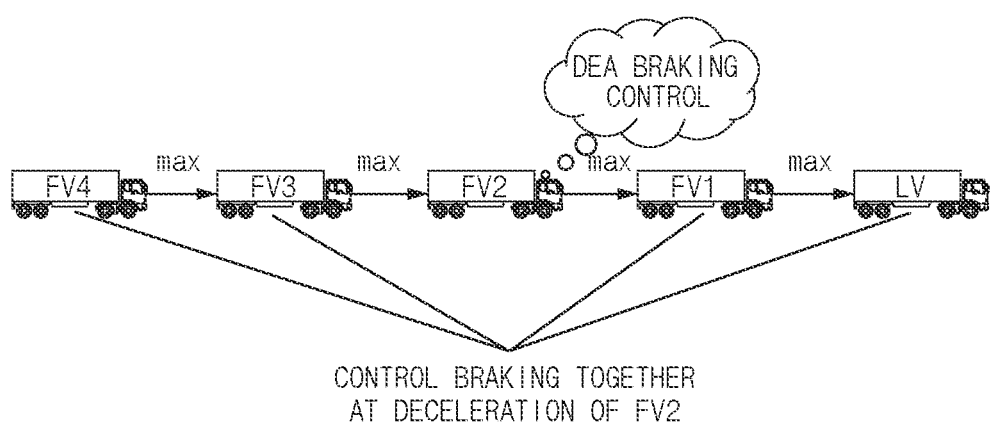
FIG. 4 is a drawing illustrating an exemplary screen in a braking control mode according to an embodiment of the present disclosure.

FIG. 4 is a drawing illustrating an exemplary screen in a platooning braking control mode according to an embodiment of the present disclosure. Referring to FIG. 4, in a braking control mode, all platooning vehicles LV, FV1, FV3, and FV4 may start braking control together to maintain an interval from a careless platooning vehicle FV2. In this case, each of the drivers of the other platooning vehicles LV, FV1, FV3, and FV4 may select to maintain a current platoon, form a new platoon with other vehicles except for the careless driving vehicle FV2, or depart from the current platoon, by means of a user setting menu (USM).

Figure 5:
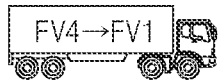
FIG. 5 is a drawing illustrating an exemplary screen output in a braking control mode according to an embodiment of the present disclosure.
Figure 5:
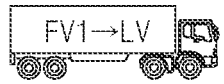

FIG. 5 is a drawing illustrating an exemplary screen output in a platooning braking control mode according to an embodiment of the present disclosure. Referring to FIG. 5, a processor 120 of FIG. 1 may provide a notification that a braking control mode starts during platooning by means of an interface 500 of FIG. 1 and may output a menu screen capable of allowing a user to select platoon departure, new platoon formation, current platoon maintenance, or the like on the interface 500. This selection may be performed during a predetermined time before stopping after the braking control mode is entered.

While selected by the user, the processor 120 may display whether platooning participants make any selection in real time on the interface 500. When there is a platoon member who selects the new platoon formation, the processor 120 may display a new platoon consisting of corresponding vehicles on the interface 500 in advance. In this case, the preview may include a new leading vehicle candidate, string information, or the like. Furthermore, each of the drivers may change his or her selection during the selection time.

When the selections of the drivers are completed, the processor 120 may enter a platoon re-formation mode. In other words, when the new platoon formation is selected from the driver in the braking control mode and the selection time is ended, the processor 120 may enter the platoon re-formation mode for re-forming the platoon depending on the selections of the platoon drivers.

When the driver selects the platoon departure, the processor 120 may hand over vehicle control authority to the driver and may control the vehicle of the driver to travel according to driver manipulation.

When the driver selects the new platoon formation, the processor 120 may control a lane change to a left lane or a right lane to form a new string and may adjust an interval in the new string.

The processor 120 may determine whether there is a non-platooning vehicle in the new string after completing the lane change and may set the non-platooning vehicle to an obstacle vehicle (OV) to perform platoon control in an OV mode.

When the driver selects the new platoon formation, the processor 120 of the platooning controller 100 of each of the vehicles which select the new platoon formation may control to make a lane change to a left lane to align the platoon in the form of a new platoon preview.

In this case, when one of the platooning vehicles which select the new platoon formation maintains a situation where it is impossible to make a lane change by a left-lane vehicle during n seconds, the processor 120 of the platooning controller 100 of each of the vehicles which select the new platoon formation may control to attempt for the vehicles which select the new platoon formation to make a lane change to a right lane.

Herein, when it is impossible to make the lane change to the right lane during n seconds, the processor 120 of the platooning controller 100 of each of the vehicles which select the new platoon formation may maintain the existing platoon.

On the other hand, the processor 120 of the platooning controller 100 of each of the vehicles which form a new platoon after the lane change may narrow a gap. In this case, a default setting of the gap may be a maximum value. When it is unable to adjust a gap in the platoon because there is a vehicle which is not a platoon member in the new platoon, the processor 120 of the platooning controller 100 of each of the vehicles which form the new platoon may travel in an OV mode of platooning. In this case, in the OV mode, the processor 120 of the platooning controller 100 of each of the vehicles which form the new platoon may guide the vehicle which is not the platoon member to depart from the string or may make a lane change.

When the driver selects the current platoon maintenance, the processor 120 may control a speed of each of the platooning vehicles to maintain a distance from a vehicle in a careless driving state or a drowsy driving state a predetermined distance and may determine whether a vehicle which selects the platoon departure or the new platoon formation remains in the current string. When the vehicle remains, the processor 120 may set the remaining vehicle to an OV and may perform platoon control in the OV mode.

In other words, when the driver selects the current platoon maintenance, the processor 120 may control a speed to maintain a distance from a careless driving vehicle. In this case, when the platooning vehicle which selects the new platoon formation and the platoon departure does not depart from the existing string, the processor 120 of the platooning controller 100 of the vehicle which selects the current platoon maintenance may recognize the vehicle which does not depart from the existing string as an OV and may control the vehicle to travel in the OV mode.

Figure 6:
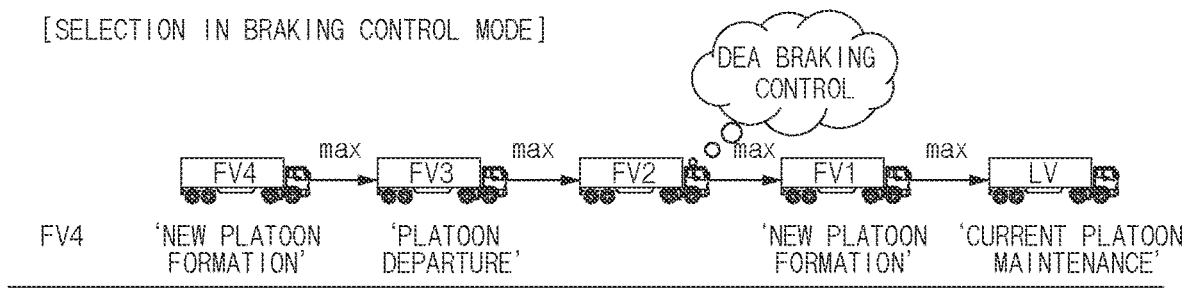
FIG. 6 is a drawing illustrating an exemplary screen of selection in a platoon re-formation mode according to an embodiment of the present disclosure.
Figure 7:
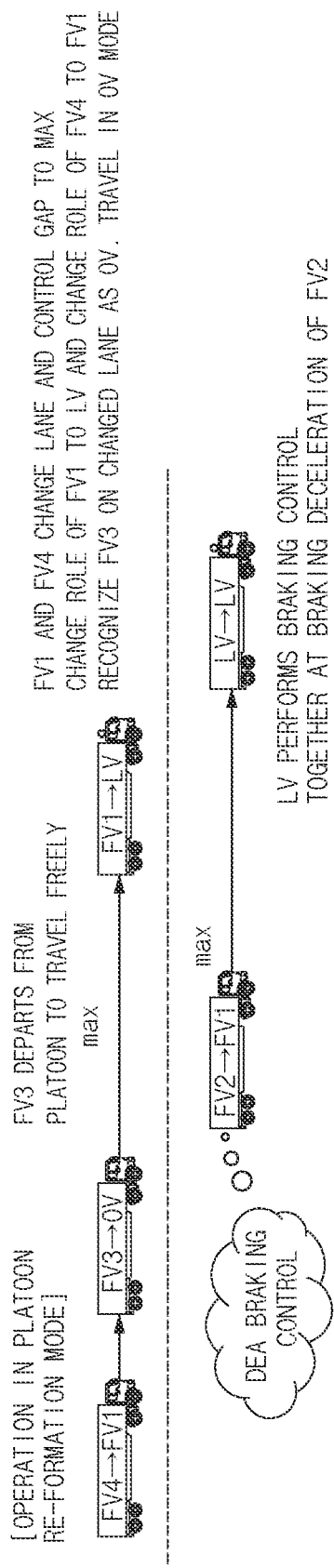
FIG. 7 is a drawing illustrating an exemplary screen of operation in a platoon re-formation mode according to an embodiment of the present disclosure.

FIG. 6 is a drawing illustrating an exemplary screen of selection in a platoon re-formation mode according to an embodiment of the present disclosure. FIG. 7 is a drawing illustrating an exemplary screen of operation in a platoon re-formation mode according to an embodiment of the present disclosure.

Referring to FIG. 6, an example where, when a braking control mode of a following vehicle FV2 is performed, a leading vehicle LV selects maintain current platoon maintenance, a following vehicle FV1 selects new platoon formation, a following vehicle FV3 selects the platoon departure, and a following vehicle FV4 selects the new platoon formation is disclosed.

Referring to FIG. 7, the leading vehicle LV which selects the current platoon maintenance may continue playing a role as the leading vehicle LV, and the following vehicles FV1 and FV4 which select the new platoon formation may make a lane change to the left to form a new platoon. The following vehicle FV2 which is performing the braking control may travel immediately after the leading vehicle LV to be a following vehicle FV1_new2. In this case, the leading vehicle LV may perform braking control together at braking deceleration of the following vehicle FV1_new2.

Thus, the following vehicle FV1 may be a leading vehicle LV in the new platoon, and the following vehicle FV4 may play a role as a following vehicle FV1 in the new platoon. In this case, an inter-vehicle distance between the leading vehicle LV_new and the following vehicle FV_new1 in the new platoon may be set to a maximum value. Furthermore, an inter-vehicle distance between the leading vehicle LV of the existing platoon and the following vehicle FV1_new2 may be set to a maximum value.

Meanwhile, when the following vehicle FV3 which selects the platoon departure is included in the new string, the platooning vehicles LV_new and FV1 new may recognize the following vehicle FV3 to an OV and may perform driving control in an OV mode.

A communication device 300 of FIG. 1 may be a hardware device implemented with various electronic circuits to transmit and receive a signal through a wireless or wired connection, which may perform a wireless Internet technology with platooning vehicles, surrounding vehicles, or a surrounding infrastructure and may communicate with the autonomous controller 200 in the vehicle through a network communication technology in the vehicle. Herein, the network communication technology in the vehicle may be to perform inter-vehicle communication through controller area network (CAN) communication, local interconnect network (LIN) communication, flex-ray communication, or the like. Furthermore, the wireless Internet technology may include wireless local area network (WLAN), wireless broadband (WiBro), wireless-fidelity (Wi-Fi), world interoperability for microwave access (WiMAX), or the like. Furthermore, a short range communication technology may include Bluetooth, ZigBee, ultra wideband (UWB), radio frequency identification (RFID), infrared data association (IrDA), or the like.

As an example, the communication device 300 may perform vehicle-to-vehicle (V2V) communication between platooning vehicles to share platooning information. In this case, the platooning information may include information about a platooning speed, an inter-vehicle distance, a destination, a path, string merging or release, or braking or driving of a leading vehicle.

The sensor device 400 may include one or more sensors which detect an obstacle, for example, a preceding vehicle, located around the vehicle and measure a distance from the obstacle and/or a relative speed of the obstacle.

The sensing device 400 may have a plurality of sensors to sense objects outside the vehicle and may obtain information about a location of the object, a speed of the object, a movement direction of the object, and/or a type (e.g., a vehicle, a pedestrian, a bicycle, a motorcycle, or the like) of the object. To this end, the sensing device 400 may include a camera, a radar, an ultrasonic sensor, a laser scanner and/or a corner radar, a light detection and ranging (LiDAR), an acceleration sensor, a yaw rate sensor, a torque sensor and/or a wheel speed sensor, a steering angle sensor, or the like. An embodiment of the present disclosure may discover a parking space using the ultrasonic sensor, may determine whether there is a following vehicle using the camera, and may estimate a current location of the vehicle for generating a parking path using the wheel speed sensor, the steering angle sensor, the ultrasonic sensor, or the like. Furthermore, an embodiment of the present disclosure may obtain information about a location of a target parking space, a size of the target parking space, a location of a parking control reference point, which is a reference point for performing parking control, or a parking target point, by means of the sensing device 400.

The interface 500 may include an input means for receiving a control command from a user and an output means for outputting an operation state, an operation result, or the like of the platooning controller 100. The interface 500 may be implemented as a head up display (HUD), a cluster, an audio video navigation (AVN), a human machine interface (HMI), a user setting menu (USM), or the like. Upon DEA braking control of the platoon, the interface 500 may output a screen for selection of whether to maintain the platoon, form a new platoon, or depart from the platoon to a platoon driver and may receive a selection from the driver on the screen.

The input means may include a key button and may further include a mouse, a joystick, a jog shuttle, a stylus pen, or the like. Furthermore, the input means may further include a soft key implemented on a display. The output means may output a visual and audible alert to raise awareness of careless or drowsy driving of the driver or may output a platooning situation.

The output means may include the display and a voice output means such as a speaker. In this case, when a touch sensor such as a touch film, a touch sheet, or a touch pad is provided in the display, the display operates as a touchscreen and may be implemented in a form where the input means and the output means are integrated with each other.

In this case, the display may include at least one of a liquid crystal display (LCD), a thin film transistor-LCD (TFT-LCD), an organic light-emitting diode (OLED) display, a flexible display, a field emission display (FED), or a three-dimensional (3D) display. Moreover, the display may be implemented as a touchscreen including a touch panel to be used as an input device other than an output device.

The vehicle controller 600 may interwork with the platooning controller 100 and the autonomous controller 200 to control a behavior of the vehicle. In this case, the behavior of the vehicle may include a speed of the vehicle, an acceleration and deceleration of the vehicle, a posture of the vehicle, braking of the vehicle, or the like.

As such, an embodiment of the present disclosure may control an inter-vehicle distance and a speed between platooning vehicles depending on careless driving or drowsy driving of the vehicle to minimize an unnecessary alert and unnecessary braking control and increase convenience of platooning and may quickly re-form a new platoon in a string upon braking control to increase efficiency of the platoon.

Figure 8:
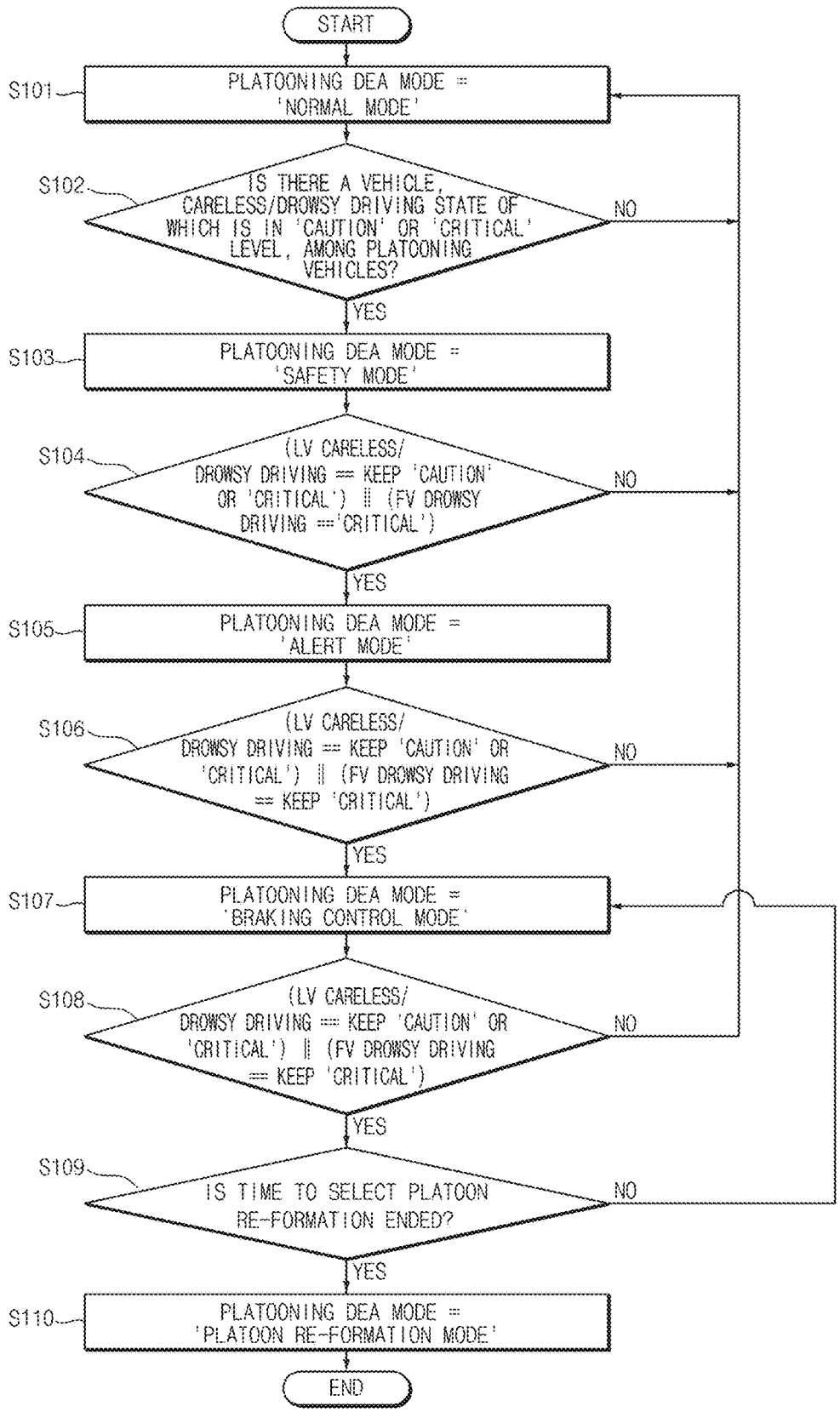
FIG. 8 is a flowchart illustrating a platooning control method upon driver carelessness according to an embodiment of the present disclosure.

Hereinafter, a description will be given in detail of a platooning control method according to an embodiment of the present disclosure with reference to FIG. 8. FIG. 8 is a flowchart illustrating a platooning control method upon driver carelessness according to an embodiment of the present disclosure.

Hereinafter, it is assumed that a platooning controller 100 of FIG. 1 performs a process of FIG. 8. Furthermore, in a description of FIG. 8, an operation described as being performed by an apparatus may be understood as being controlled by a processor 120 of the platooning controller 100.

Referring to FIG. 8, when platooning vehicles are traveling in a state where a platooning DEA mode is a normal mode in S101, in S102, an apparatus of each of the platooning vehicles may determine whether there is a vehicle, a careless driving state or a drowsy driving state of which is in a caution level or a critical level, among the platooning vehicles.

When there is the vehicle, the careless driving state or the drowsy driving state of which is in the caution level or the critical level, among the platooning vehicles, in S103, the apparatus of each of the platooning vehicles may enter a safety mode of the platooning DEA mode.

In S104, the apparatus of each of the platooning vehicles may determine whether a careless driving state or a drowsy driving state of a leading vehicle among the platooning vehicles continues in the caution level or the critical level during a predetermined time or whether a drowsy driving state of a following vehicle is in the critical level. When the careless driving state or the drowsy driving state of the leading vehicle among the platooning vehicles continues in the caution level or the critical level during the predetermined time or when the drowsy driving state of the following vehicle is in the critical level, in S105, the apparatus of each of the platooning vehicles may enter an alert mode of the platooning DEA mode.

In S106, the apparatus of each of the platooning vehicles may determine whether a careless driving state or a drowsy driving state of the leading vehicle among the platooning vehicles continues in the caution level or the critical level during a predetermined time or whether a drowsy driving state of a following vehicle continues in the critical level during a predetermined time. When the careless driving state or the drowsy driving state of the leading vehicle among the platooning vehicles continues in the caution level or the critical level during the predetermined time or when the drowsy driving state of the following vehicle continues in the critical level during the predetermined time, in S107, the apparatus of each of the platooning vehicles may enter a braking control mode of the platooning DEA mode.

In S108, the apparatus of each of the platooning vehicles may determine whether a careless driving state or a drowsy driving state of the leading vehicle among the platooning vehicles continues in the caution level or the critical level during the predetermined time or whether a drowsy driving state of the following vehicle continues in the critical level during the predetermined time, after the platooning vehicles perform the braking control. When the careless driving state or the drowsy driving state of the leading vehicle among the platooning vehicles continues in the caution level or the critical level during the predetermined time or when the drowsy driving state of the following vehicle continues in the critical level during the predetermined time, after the platooning vehicles perform the braking control, in S109, the apparatus of each of the platooning vehicles may receive a platoon re-formation selection from a driver of each vehicle and may check whether a re-formation selection time is ended. In Silo, the apparatus of each of the platooning vehicles may enter a platoon re-formation mode of the platooning DEA mode.

Hereinafter, a description will be given of a control method for each platooning DEA mode with reference to FIGS. 9A to 9D. Hereinafter, it is assumed that a platooning controller 100 of FIG. 1 performs a process of FIGS. 9A to 9D. Furthermore, in a description of FIGS. 9A to 9D, an operation described as being performed by an apparatus may be understood as being controlled by a processor 120 of the platooning controller 100.

Figure 9A:
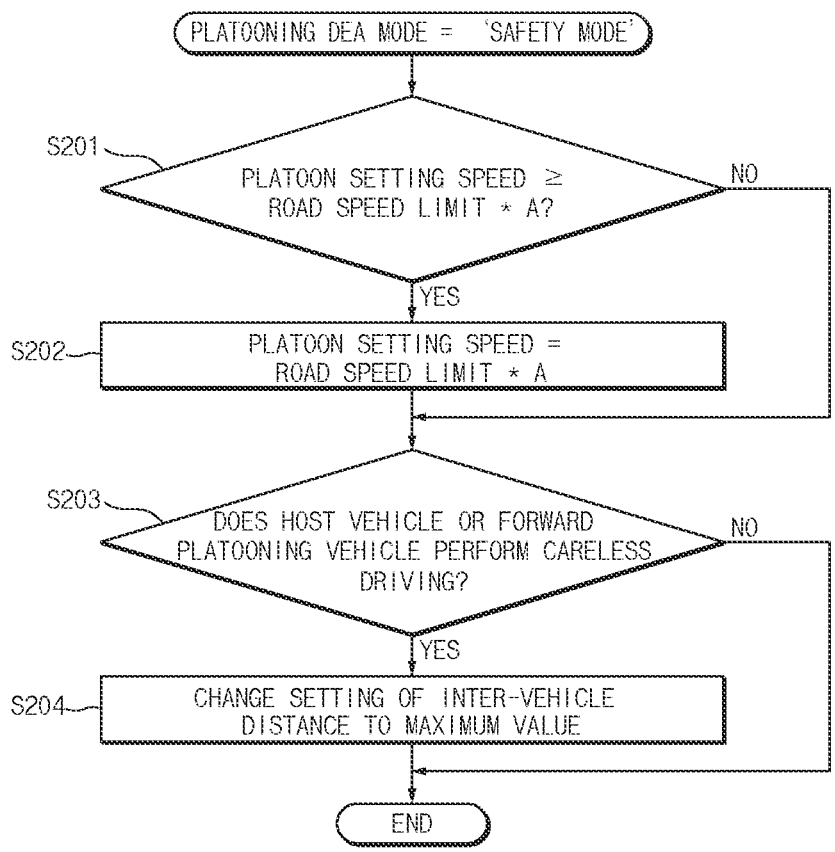
FIG. 9A is a flowchart illustrating a control method in a safety mode according to an embodiment of the present disclosure.

FIG. 9A is a flowchart illustrating a control method in a platooning safety mode according to an embodiment of the present disclosure.

Referring to FIG. 9A, when the platooning DEA mode enters the safety mode, in S201, an apparatus may determine whether a platoon setting speed is greater than or equal to a predetermined ratio A of the road speed limit. For example, the predetermined ratio may be 90%.

When the platoon setting speed is greater than or equal to the predetermined ratio of the road speed limit, in S202, the apparatus may set the platoon setting speed to the predetermined ratio of the road speed limit. In S203, the apparatus may determine whether a host vehicle or a platooning vehicle is in a careless driving state.

When the host vehicle or the platooning vehicle is in the careless driving state, in S204, the apparatus of each platooning vehicle may change a setting of an inter-vehicle distance to a maximum value.

Figure 9B:
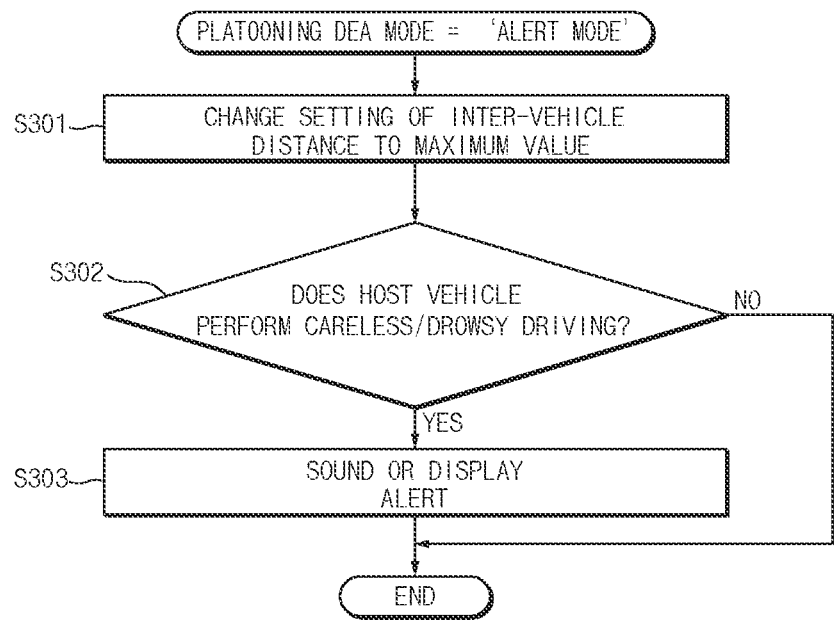
FIG. 9B is a flowchart illustrating a control method in an alert mode according to an embodiment of the present disclosure.

FIG. 9B is a flowchart illustrating a control method in a platooning alert mode according to an embodiment of the present disclosure.

Referring to FIG. 9B, when the platooning DEA mode enters the alert mode, in S301, the apparatus may change a setting of an inter-vehicle distance to a maximum value. In S302, the apparatus may determine whether the host vehicle is in a careless driving state or a drowsy driving state.

When the host vehicle is in the careless driving state or the drowsy driving state, in S303, the apparatus may output an alert based on a sound or a screen.

Figure 9C:
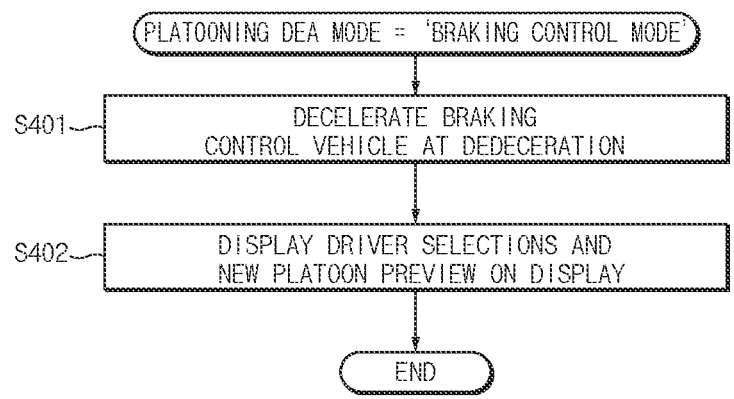
FIG. 9C is a flowchart illustrating a control method in a braking control mode according to an embodiment of the present disclosure.

FIG. 9C is a flowchart illustrating a control method in a platooning braking control mode according to an embodiment of the present disclosure.

Referring to FIG. 9C, when the platooning DEA mode enters the braking control mode, in S401, the apparatus may perform deceleration driving control at deceleration of a braking control vehicle.

In S402, the apparatus may display driver selections and a new platoon preview on an interface 500 of FIG. 1. In this case, the driver selections may include platoon departure, current platoon maintenance, new platoon formation, or the like. The displaying of the new platoon preview may refer to displaying a new string according to the new platoon formation, the current platoon maintenance, or the like by selection of drivers of platooning vehicles.

Figure 9D:
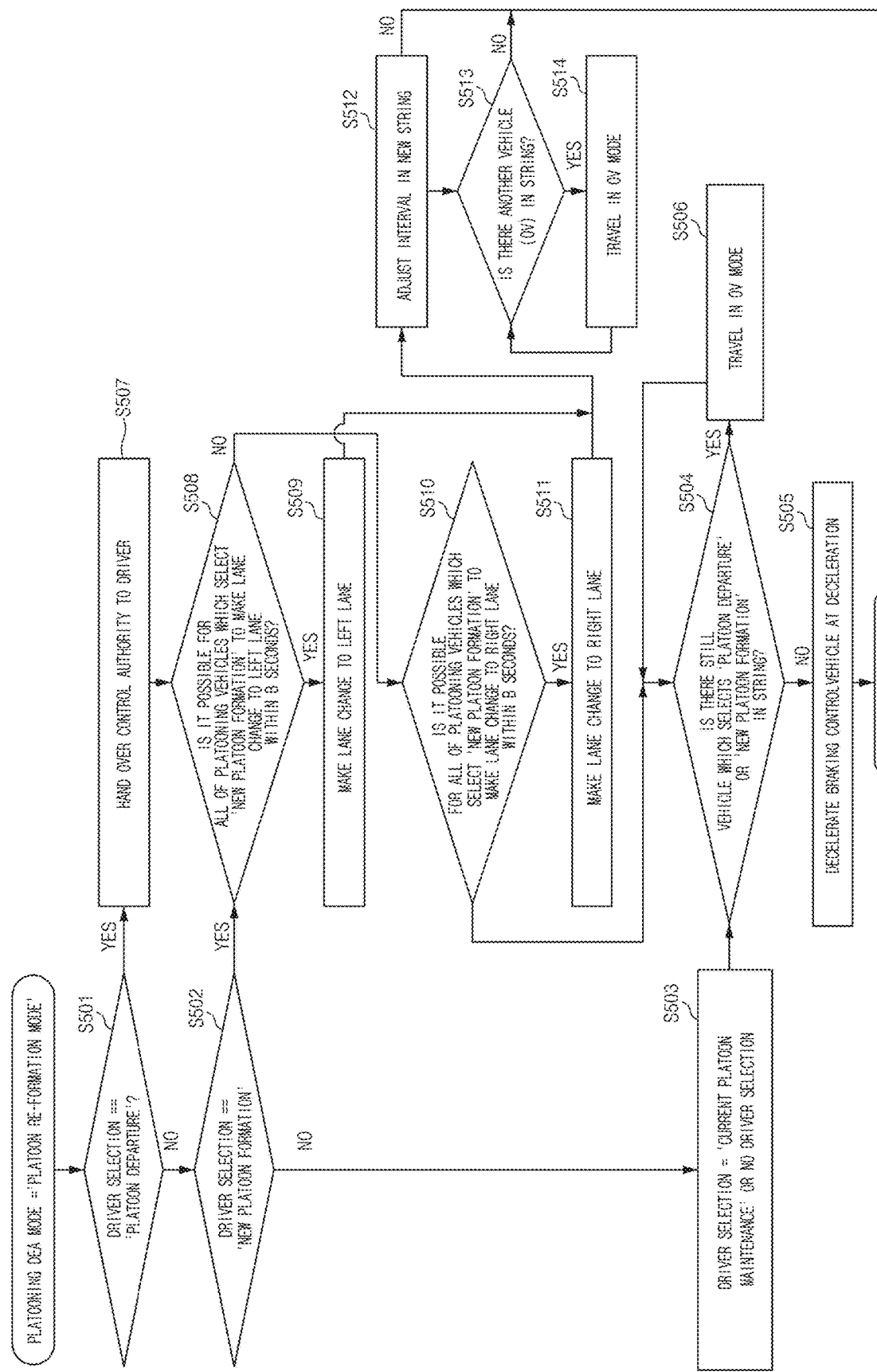
FIG. 9D is a flowchart illustrating a control method in a platoon re-formation mode according to an embodiment of the present disclosure.

FIG. 9D is a flowchart illustrating a control method in a platooning platoon re-formation mode according to an embodiment of the present disclosure.

Referring to FIG. 9D, when the platooning DEA mode enters the platoon re-formation mode, the apparatus may determine an item selected from each platooning vehicle. First of all, in S501, the apparatus may determine whether a driver selects platoon departure. When the driver does not select the platoon departure, in S502, the apparatus may determine whether the driver selects new platoon formation.

Furthermore, when the driver does not select the new platoon formation, in S503, the apparatus may determine that the driver selects current platoon maintenance or that there is no selection of the driver. In S504, the apparatus may determine whether there is still a vehicle which selects the platoon departure or the new platoon formation in the current string.

When there is no vehicle which selects the platoon departure or the new platoon formation in the current string, in S505, the apparatus may decelerate the host vehicle to deceleration of a braking control vehicle.

Meanwhile, when there is still the vehicle which selects the platoon departure or the new platoon formation in the current string, in S506, the apparatus may determine the vehicle as an OV and may perform driving control in an OV mode.

Meanwhile, when the driver selects the platoon departure in S501, in S507, the apparatus may hand over control authority to the driver.

When the driver selects the new platoon formation in S502, in S508, the apparatus may determine whether it is possible for all of the platooning vehicles which select the new platoon formation to make a lane change to a left lane within B seconds.

When it is possible to make the lane change to the left lane with B seconds, in S509, the apparatus may make the lane change to the left lane. When it is difficult to make the lane change to the left lane within B seconds, in S510, the apparatus may determine whether it is possible for all the platooning vehicles which select the new platoon formation to make a lane change to a right lane within B seconds.

When it is possible to make the lane change to the right lane with B seconds, in S511, the apparatus may make the lane change to the right lane. When it is difficult to make the lane change to the right lane within B seconds, in S504, the apparatus may determine whether there is still a vehicle which selects the platoon departure or the new platoon formation in the string. Thereafter, the apparatus may perform S505 and S506 described above.

After making the lane change to the right lane, in S512, the apparatus may adjust an interval in the new string. In S513, the apparatus may determine whether there is an OV in the string.

When there is the OV in the string, in S514, the apparatus may perform driving control in an OV mode. When there is no OV, the apparatus may end the process.

As such, an embodiment of the present disclosure may minimize inconvenience of a platooning driver due to a frequent DEA alert or frequent braking control in a platooning situation, may change a setting of an inter-vehicle distance and a setting speed depending on a driver state to enhance stability, and may quickly re-form a platoon within platoon members to increase platoon efficiency, when the platoon member performs braking control due to the platooning DEA mode.

Figure 10:
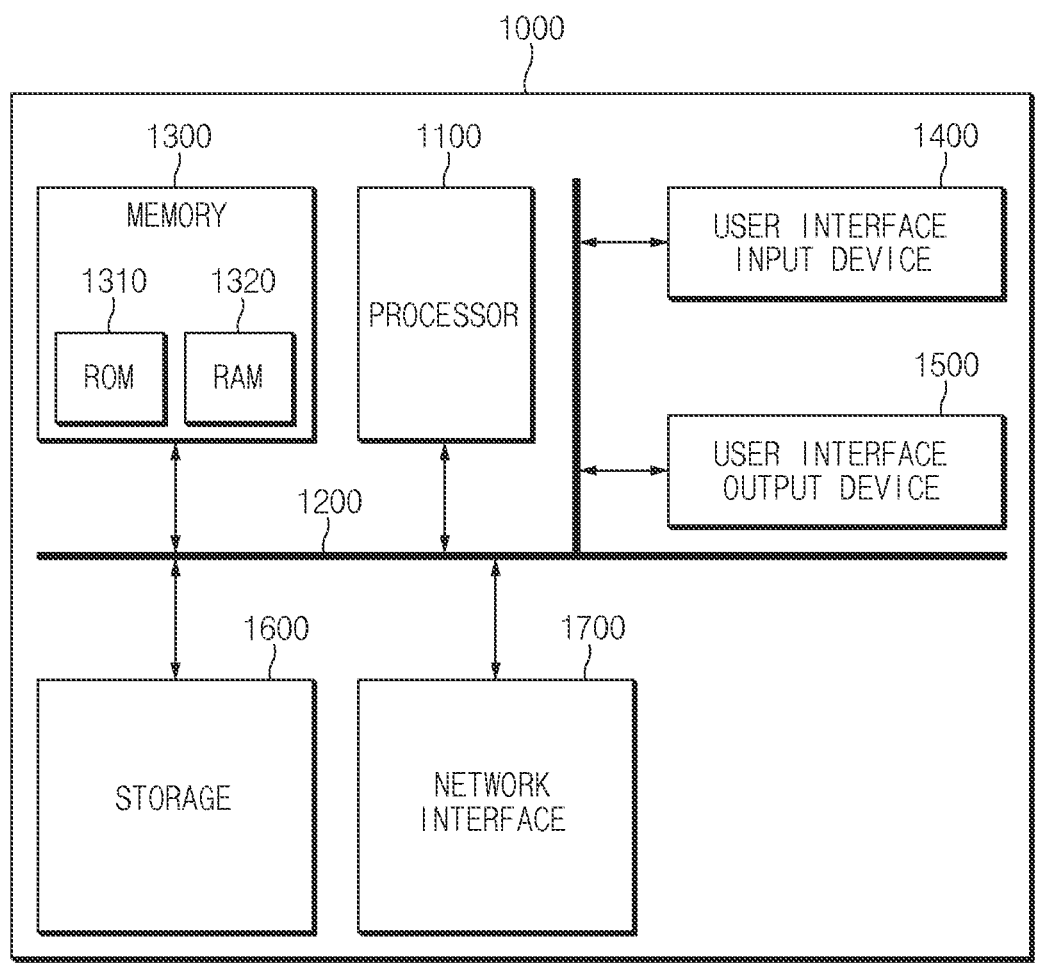
FIG. 10 is a block diagram illustrating a computing system according to an embodiment of the present disclosure.

FIG. 10 is a block diagram illustrating a computing system according to an embodiment of the present disclosure.

Referring to FIG. 10, a computing system 1000 may include at least one processor 1100, a memory 130o, a user interface input device 140o, a user interface output device 150o, storage 160o, and a network interface 170o, which are connected with each other via a bus 1200.

The processor 1100 may be a central processing unit (CPU) or a semiconductor device that processes instructions stored in the memory 1300 and/or the storage 160o. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may minimize inconvenience of a platooning driver due to a frequent DEA alert or frequent braking control in a platooning situation, may change a setting of an inter-vehicle distance and a setting speed depending on a driver state to enhance stability, and may quickly re-form a platoon within platoon members to increase platoon efficiency, when the platoon member performs braking control due to the platooning DEA mode.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A platooning controller, comprising:
a processor; and
a memory storing instructions which, when executed by the processor, cause the processor to:
control a speed, an inter-vehicle distance, or a lane change of at least one platooning vehicle of a plurality of platooning vehicles that are driving in a platoon;
set a platooning driver emergency assist (DEA) mode of the plurality of platooning vehicles that are driving in the platoon to a normal mode based at least in part on a first determination that a careless driving state or a drowsy driving state of a driver of a platooning vehicle of the plurality of platooning vehicles is at a safety level;
make a second determination, while the DEA mode is set to the normal mode, that the careless driving state or the drowsy driving state of the driver is at a caution level or a critical level;
transition the platooning DEA mode to a safety mode based on the second determination;
make a third determination that the careless driving state or the drowsy driving state of the driver has remained at the caution level or the critical level for a first predetermined amount of time after the platooning DEA mode transitions to the safety mode;
transition the platooning DEA mode to an alert mode based on the third determination;
make a fourth determination that the careless driving state or the drowsy driving state of the driver has remained at the caution level or the critical level for a second predetermined amount of time after the platooning DEA mode transitions to the alert mode;

transition the platooning DEA mode to a braking control mode based on the fourth determination;
make a fifth determination that the careless driving state or the drowsy driving state of the driver has remained at the caution level or the critical level for a third predetermined amount of time after the platooning DEA mode transitions to the braking control mode; and
based on the fifth determination, provide platoon re-formation options to other drivers of the plurality of platooning vehicles that are not the driver of the platooning vehicle.

2. The platooning controller of claim 1, wherein the careless driving state or the drowsy driving state of the driver is classified, by a DEA component, as the safety level, the caution level, or the critical level based on a ratio where the driver keeps his or her eyes on a road or a drowsiness recognition time.

3. The platooning controller of claim 1, wherein execution of the instructions by the processor further causes the processor to, when the platooning DEA mode is set to the safety mode:
set a platoon setting speed to a predetermined ratio of a road speed limit in the safety mode; and
set the inter-vehicle distance between a vehicle where the careless driving state or the drowsy driving state of the driver is determined by a DEA component to be at the caution level and a following vehicle to a maximum value.

4. The platooning controller of claim 1, wherein execution of the instructions by the processor further causes the processor to:
transition the platooning DEA mode to the alert mode when the careless driving state or the drowsy driving state of the driver of a leading vehicle among the plurality of platooning vehicles remains in the caution level or the critical level for a predetermined period or when the drowsy driving state of another driver of a following vehicle is in the caution level.

5. The platooning controller of claim 1, wherein execution of the instructions by the processor further causes the processor to:
set inter-vehicle distances between each pair of adjacent vehicles in the platoon to a maximum value in the alert mode.

6. The platooning controller of claim 1, wherein execution of the instructions by the processor further causes the processor to:
transition the platooning DEA mode to the braking control mode when the careless driving state or the drowsy driving state of another driver of a following vehicle is in the critical level.

7. The platooning controller of claim 1, wherein execution of the instructions by the processor further causes the processor to:
control all vehicles in the platoon to perform braking control in the braking control mode.

8. The platooning controller of claim 1, wherein execution of the instructions by the processor further causes the processor to:
receive a selection of one of the platoon re-formation options from at least one driver in the platoon before stopping after entering the braking control mode.

9. The platooning controller of claim 1, wherein execution of the instructions by the processor further causes the processor to:

enter a platoon re-formation mode when a selection of one of the platoon re-formation options by at least one driver in the platoon is completed.

10. The platooning controller of claim 1, wherein execution of the instructions by the processor further causes the processor to:
hand over vehicle control authority to at least one driver in the platoon when the at least one driver selects platoon departure from among the platoon re-formation options.

11. The platooning controller of claim 1, wherein execution of the instructions by the processor further causes the processor to:
control the speed of each of the plurality of platooning vehicles to maintain a distance from a platooning vehicle in the careless driving state or the drowsy driving state as a predetermined distance;
determine whether one of the plurality of platooning vehicles selects, from among the platoon re-formation options, platoon departure or new platoon formation but still remains in the platoon; and
set the one of the plurality of platooning vehicles to an obstacle vehicle (OV) to perform platoon control in an OV mode.

12. A vehicle system, comprising:
one or more processors;
a driver emergency assist (DEA) component, executing using the one or more processors, and configured to determine a careless driving state or a drowsy driving state of a driver; and
a platooning controller, executing using the one or more processors, and configured to:
control a speed, an inter-vehicle distance, or a lane change of at least one platooning vehicle of a plurality of platooning vehicles that are driving in a platoon;
set a platooning DEA mode of the plurality of platooning vehicles that are driving in the platoon to a normal mode based at least in part on a first determination that the careless driving state or the drowsy driving state of the driver of a platooning vehicle of the plurality of platooning vehicles is at a safety level;
make a second determination, while the DEA mode is set to the normal mode, that the careless driving state or the drowsy driving state of the driver is at a caution level or a critical level;
transition the platooning DEA mode to a safety mode based on the second determination;
make a third determination that the careless driving state or the drowsy driving state of the driver has remained at the caution level or the critical level for a first predetermined amount of time after the platooning DEA mode transitions to the safety mode;
transition the platooning DEA mode to an alert mode based on the third determination;
make a fourth determination that the careless driving state or the drowsy driving state of the driver has remained at the caution level or the critical level for a second predetermined amount of time after the platooning DEA mode transitions to the alert mode;
transition the platooning DEA mode to a braking control mode based on the fourth determination;
make a fifth determination that the careless driving state or the drowsy driving state of the driver has remained at the caution level or the critical level for a third predetermined amount of time after the platooning DEA mode transitions to the braking control mode; and
based on the fifth determination, provide platoon re-formation options to other drivers of the plurality of platooning vehicles that are not the driver of the platooning vehicle.

13. The vehicle system of claim 12, further comprising an interface configured to display:
a screen for receiving a driver selection;
an example of platoon re-formation, based on the driver selection, as a preview in a platooning situation; and
a platoon re-formation mode of the platooning DEA mode.

14. A platooning control method, comprising:
setting a platooning driver emergency assist (DEA) mode of a plurality of platooning vehicles that are driving in a platoon to a normal mode based at least in part on a first determination that a careless driving state or a drowsy driving state of a driver of a platooning vehicle of the plurality of platooning vehicles is at a safety level;
making a second determination, while the DEA mode is set to the normal mode, that the careless driving state or the drowsy driving state of the driver is at a caution level or a critical level;
transitioning the platooning DEA mode to a safety mode based on the second determination;
making a third determination that the careless driving state or the drowsy driving state of the driver has remained at the caution level or the critical level for a first predetermined amount of time after the platooning DEA mode transitions to the safety mode;
transitioning the platooning DEA mode to an alert mode based on the third determination;
making a fourth determination that the careless driving state or the drowsy driving state of the driver has remained at the caution level or the critical level for a second predetermined amount of time after the platooning DEA mode transitions to the alert mode;
transitioning the platooning DEA mode to a braking control mode based on the fourth determination;
controlling braking of the platoon during the braking control mode;
making a fifth determination that the careless driving state or the drowsy driving state of the driver has remained at the caution level or the critical level for a third predetermined amount of time after the platooning DEA mode transitions to the braking control mode; and
based on the fifth determination, providing platoon re-formation options to other drivers of the plurality of platooning vehicles that are not the driver of the platooning vehicle.

\* \* \* \* \*